May 26, 1953   F. H. HENDRICK   2,639,756
CAMBER ADJUSTING TOOL
Filed May 5, 1950
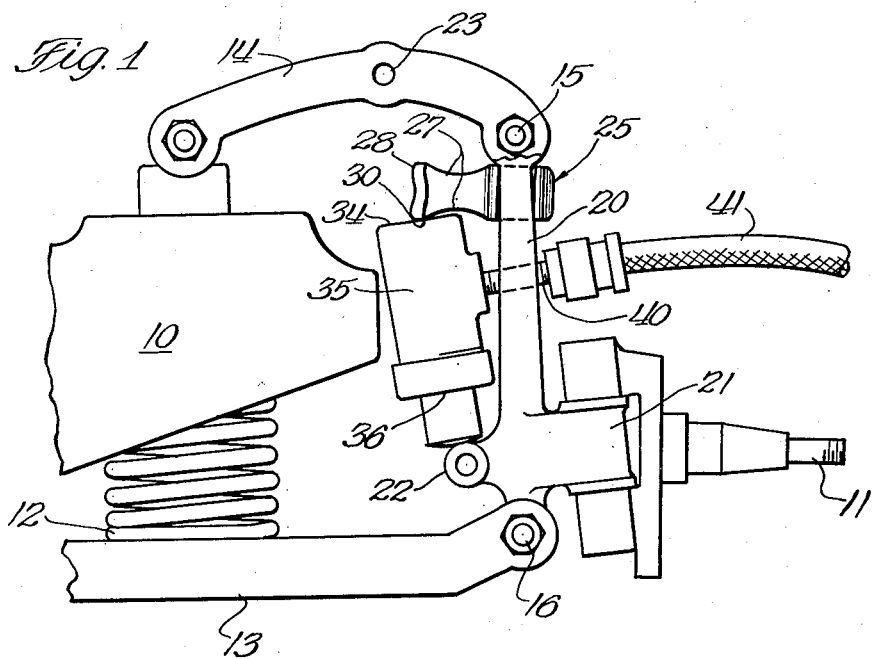
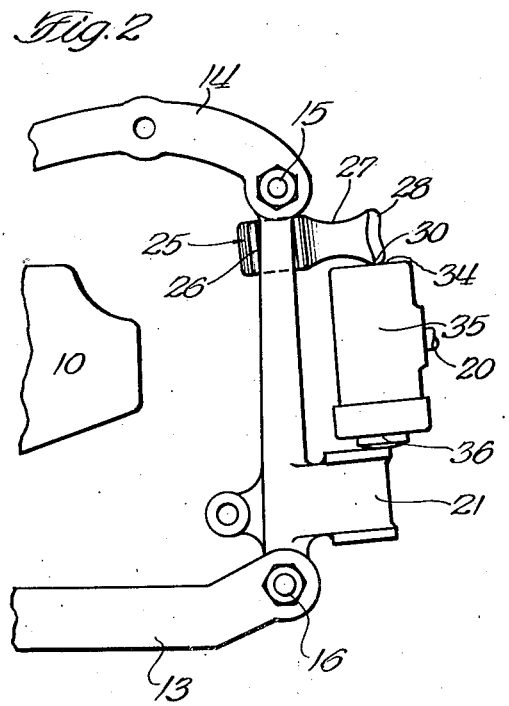
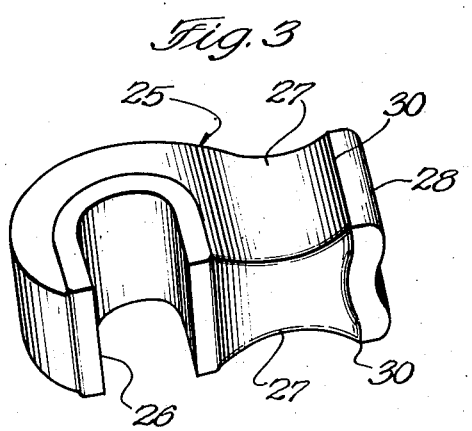
INVENTOR.
Frank H. Hendrick
BY Cook and Schermerhorn
ATTORNEYS Patented May 26, 1953

2,639,756

UNITED STATES PATENT OFFICE 2,639,756

CAMBER ADJUSTING TOOL

Frank H. Hendrick, Portland, Oreg.

Application May 5, 1950, Serial No. 160,361

1 Claim. (Cl. 153—32)

This invention relates to a tool for adjusting the camber in the vertical steering knuckle support in certain common types of so-called knee action linkage used in automobile front end suspensions.

Different types of tools have heretofore been devised for adjusting the camber in such suspensions by bending the steering knuckle support. Most conventional tools for this purpose are objectionable because they develop the necessary bending force by means of attachment to or reaction against some other members of the suspension system, or even the automobile frame itself, remote from the steering knuckle support. When this is done, some parts of the suspension are subjected to an objectionable stress, and usually the suspension is thrown out of its normal position, so that the corrective effects produced cannot be immediately ascertained. The procedure is tedious and considerable lack of precision is inevitable when numerous fastenings and adjustments have to be removed after each application of bending force in order to determine whether sufficient adjustment was effected.

There are also known tools which may be applied to the steering knuckle support without reacting against the horizontal control arms or the automobile frame, but such devices have the objection of utilizing screw threads to obtain the necessary bending force, as well as the disadvantage of being applicable to only the outside of the knuckle support, and not to the inside thereof. Such devices have proved unsatisfactory because screw threads cannot be made sufficiently strong in a small tool to withstand the high bearing pressures which must be developed to bend the knuckle support. The threads fail rather quickly, rendering the tool useless. The presence of the screw prevents the tool from being applied to the inside of the knuckle support without removing the knuckle support from the horizontal control arms of the suspension.

Objects of the present invention are, therefore, to provide a chamber adjusting tool which may be applied to either side of the knuckle support to increase or decrease the camber without dismantling the knee action linkage, to provide a tool which does not have wearing parts such as screws, cross pins and linkage, to provide a device which may be applied to the steering knuckle support itself without reacting against other parts of the suspension or the frame of the automobile, to provide a tool of the type described which can be used with a conventional short hydraulic jack, to provide a tool which will correct the camber in such a manner that it may be measured directly during the adjusting process without dismantling the equipment, and to provide a practical tool which is generally rugged and easy to use and inexpensive to manufacture.

These and other objects will become apparent and the invention will be more clearly understood with reference to the preferred embodiment illustrated on the accompanying drawing and described in the following specification. It is to be understood, however, that the drawing is for the purpose of illustrating the invention, and is not intended to limit the invention.

In the drawings:

Figure 1 is a fragmentary front elevation view of a common type of knee action suspension for an automobile, showing the present tool applied to the inside of the steering knuckle support to decrease the camber;

Figure 2 is a view similar to Figure 1, showing the tool applied to the outside of the steering knuckle support to increase the camber; and Figure 3 is a perspective view of the tool itself.

Referring first to Figure 1, the numeral 10 designates a portion of the frame of an automobile having a so-called pantograph type of knee action front end suspension for independent springing of the front wheel spindle 11. This type of suspension includes a coil spring 12, a pivotally mounted lower horizontal control arm 13, and a pivotally mounted upper horizontal control arm 14. The upper and lower control arms carry horizontal pins 15 and 16 at their outer extremities for pivotally mounting the steering knuckle support 20. On one side, herein referred to as the outside, the steering knuckle support has a vertical king-pin boss 21 for the wheel spindle 11, and on the other side, herein referred to as the inside, the steering knuckle support has a horizontal boss 22 for a lower shock absorber stud. The upper control arm 14 has a hole 23 to receive an upper shock absorber stud, not shown. The shock absorber studs mounted in the boss 22 and hole 23 extend to the rear and provide means for mounting a generally vertical tubular shock absorber in offset relation to the control arms 13 and 14. Although both control arms 13 and 14 have forked ends to straddle the ends of the steering knuckle support 20, the central portion of the arm 14 is ordinarily solid and does not provide clearance above the boss 22 for an upwardly extending screw on a screw operated camber adjusting tool.

Figure 3 illustrates a novel form of tool forming the subject matter of the invention, which may be applied either to the inside of the steering knuckle support of the illustrated suspension to decrease the camber, or to the outside of the steering knuckle support to increase the camber, as may be required. This tool comprises a steel forging or casting 25 having a U-shaped clamp jaw 26 with sufficient width of opening to fit loosely over the upper end of the steering knuckle support 20 just below the end enlargement which receives the pin 15. On one side of the jaw 26 is a short reduced shank or neck 27 terminating in an enlarged head 28. The important feature of the head 28 is the provision of a pair of parallel fulcrum edges 30 on oppposite sides of the tool. The edges 30 may be either of the rounded or knife edge type in order to provide rocking bearing on a flat surface, and it is important that they extend out from the reduced neck portion 27.

This form of the tool 25 allows the clamp jaw 26 to be placed on the steering knuckle support as shown in Figure 1, with the head 28 extending to the inside of the steering knuckle support above the boss 22. With the tool 25 in this position, the flat end 34 of a hydraulic jack cylinder 35 may be brought to bear against the bottom fulcrum edge 30 so that the jack piston 36 will bear against the boss 22 in the manner shown. This involves some angularity or lack of parallelism between the jack cylinder 35 and the steering knuckle support 20, causing one side of the cylinder 35 to project into the concavity of neck 27 without touching the neck. Thus, the reduced neck 27 permits rocking of the jack end surface 34 on the fulcrum edge 30 so that the parts will not slip, notwithstanding the angular relationship, when pressure is introduced into the cylinder of the jack. The hydraulic jack 35 is conventional garage equipment, and is equipped with a lateral pipe 40 for a hydraulic hose connection 41 through which liquid may be introduced to the cylinder 35 to thrust out the piston 36 with great force.

The direction of thrust of the piston 36 is perpendicular to the curved surface of boss 22 at the point, or line, of contact, and the direction of thrust of the end surface 34 is perpendicular to this surface at the line of contact with the fulcrum edge 30, so that the parts are in stable equilibrium regardless of the amount of force developed by the jack. Under the pressure of the hydraulic fluid in cylinder 35, the head 28 of the tool is forced upwardly away from the boss 22 to bend the upper end of the steering knuckle support to the right as shown in Figure 1. The result of such bend, since the upper end is held in fixed position by pin 15, is to tilt the lower part of the steering knuckle support to the left, which has the effect of reducing the camber. As the steering knuckle support bends in the manner described, the clearance between the upper corner of cylinder 35 and the reduced neck 27 allows sufficient rocking movement to occur at the fulcrum edge 30 to accommodate the relative angular movement between the tool 25 and the cylinder 35. It will be appreciated that without the reduced neck 27, only one edge of the cylinder 35 would bear against the tool 25 and produce an eccentric loading with a lateral component which would cause the cylinder to slip out of position. The clearance provided by neck 27 maintains contact between surface 34 and fulcrum edge 30 to accommodate the necessary rocking movement without any lateral component as the steering knuckle support bends.

By reason of the off-set position of the shock absorber (not shown) on its studs in the boss 22 and hole 23, there is sufficient space between the steering knuckle support 20 and frame 10 in this type of suspension to accommodate the tool 25 and jack 35 without removing the shock absorber. As has been mentioned, the shock absorber is disposed somewhat behind the plane of the view in Figure 1 and in back of the parts shown.

For increasing the camber, the tool 25 is applied with the head 28 on the outside of the steering knuckle support, as shown in Figure 2, and then, with the spindle 11 and king-pin removed from the king-pin boss 21, the hydraulic jack is inserted as shown, so that its upper end engages the fulcrum edge 30 and its lower end engages the upper side of the king-pin boss 21. When sufficient hydraulic pressure is developed in the cylinder 35, the outward expansion of the jack piston 36 lifts the head 28 of the tool relative to the boss 21 to bend the upper end of the steering knuckle support 20 to the left. This bend causes the lower part of the steering knuckle support to incline slightly to the right and increase the camber.

Having now described my invention and in what manner the same may be used, what I claim as new and desire to protect by Letters Patent is:

A reversible tool for bending an elongated steering knuckle support in one direction to increase its camber or in an opposite direction to decrease its camber comprising a short shank portion having top and bottom sides each terminating at one end of the tool in a transverse line contact fulcrum edge, and a pair of transverse parallel flat jaws on the other end of the tool extending therethrough between said top and bottom sides and perpendicular thereto, said top and bottom sides of said shank portion being concave in a longitudinal direction forming a reduced neck in said shank portion between said jaws and said fulcrum edges to accommodate relative rocking movement of either one of said fulcrum edges on a flat headed jack or the like.

FRANK H. HENDRICK.

References Cited in the file of this patent

UNITED STATES PATENTS

| Number | Name | Date |
|---|---|---|
| 2,153,867 | Holmes | Apr. 11, 1939 |
| 2,365,731 | Simons | Dec. 26, 1944 |
| 2,431,291 | Wochner | Nov. 18, 1947 |